(12) United States Patent
Xue

(10) Patent No.: US 10,152,197 B1
(45) Date of Patent: Dec. 11, 2018

(54) DYNAMIC INDICATION OF A STATUS OF AN APPLICATION

(71) Applicant: Symantec Corporation, Mountain View, CA (US)

(72) Inventor: Yong Ling Xue, Beijing (CN)

(73) Assignee: Symantec Corporation, Mountain View, CA (US)

( * ) Notice: Subject to any disclaimer, the term of this patent is extended or adjusted under 35 U.S.C. 154(b) by 716 days.

(21) Appl. No.: 14/611,709

(22) Filed: Feb. 2, 2015

(51) Int. Cl.
*G06F 3/0481* (2013.01)

(52) U.S. Cl.
CPC ................. *G06F 3/04817* (2013.01)

(58) Field of Classification Search
CPC .................................................... G06F 3/0481
See application file for complete search history.

(56) References Cited

U.S. PATENT DOCUMENTS

2008/0201649 A1* 8/2008 Mattila ............... G06F 3/04817
715/763
2015/0296072 A1* 10/2015 Zhou ................. H04M 1/72525
455/414.1

* cited by examiner

*Primary Examiner* — Andrea C Leggett
(74) *Attorney, Agent, or Firm* — Holland & Hart LLP

(57) ABSTRACT

The systems and methods described herein relate to mobile devices. More specifically, the systems and methods described herein relate to dynamically altering a stating of an application on a mobile device. Mobile devices may have several applications installed thereon. In some instances, the applications may not be available. The application icon may be dynamically altered to indicate a status of the application.

19 Claims, 8 Drawing Sheets

DYNAMIC INDICATION OF A STATUS OF AN APPLICATION

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in mobile computing products and systems. For example, users may have several applications installed on their mobile devices but may not know the status of the application until the application is launched.

SUMMARY

According to at least one embodiment, a computer-implemented method to dynamically customize an application icon on a device is described. The method may include accessing, by the device, a customization rule, wherein the customization rule includes directions to change a state of the application icon based at least in part on a detection of one or more customization parameters. The method may further include detecting a customization parameter and dynamically altering the state of the application icon based at least in part on the customization rule and the detected customization parameter In some embodiments, dynamically altering the state of the application icon may further comprise dynamically altering an appearance of the application icon to reflect a current status of an application associated with the application icon. The method may include receiving the customization rule from a sever and executing the customization rule. The method may include downloading an application and extracting the customization rule from the application. The customization rule may be embedded in the application. The method may include executing the customization rule based at least in part on the detected customization parameter.

In one embodiment, the method may include communicating a status of the application based at least in part on the state of the application icon. Dynamically altering the state of the application icon may further include causing the application icon to become invisible. An invisible application icon may prevent a user from accessing the application associated with the application icon. Dynamically altering the state of the application icon may further comprise indicating the application is not currently available. The method may include maintaining a log of attempts to utilize an unavailable application and generating a report to the user including at least the log of attempts. The method may include providing an index of meanings of different application icon appearance changes. The customization parameter may include at least one of a connectivity status, or a usage status, or an access status, or an allowable status, or a restriction status, or a combination thereof.

In another embodiment, a computing device configured for dynamically indicating a status of an application may be described. The computing device may include a processor and memory in electronic communication with the processor. The memory may store computer executable instructions that when executed by the processor cause the processor to perform steps. The steps may include accessing, by the device, a customization rule, wherein the customization rule includes directions to change a state of the application icon based at least in part on a detection of one or more customization parameters. The steps may additionally include detecting a customization parameter and dynamically altering the state of the application icon based at least in part on the customization rule and the detected customization parameter.

In another embodiment, a non-transitory computer-readable storage medium storing computer executable instructions is described. The processor may execute the instructions to perform the steps of accessing, by the device, a customization rule, wherein the customization rule includes directions to change a state of the application icon based at least in part on a detection of one or more customization parameters. The steps may additionally include detecting a customization parameter and dynamically altering the state of the application icon based at least in part on the customization rule and the detected customization parameter.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
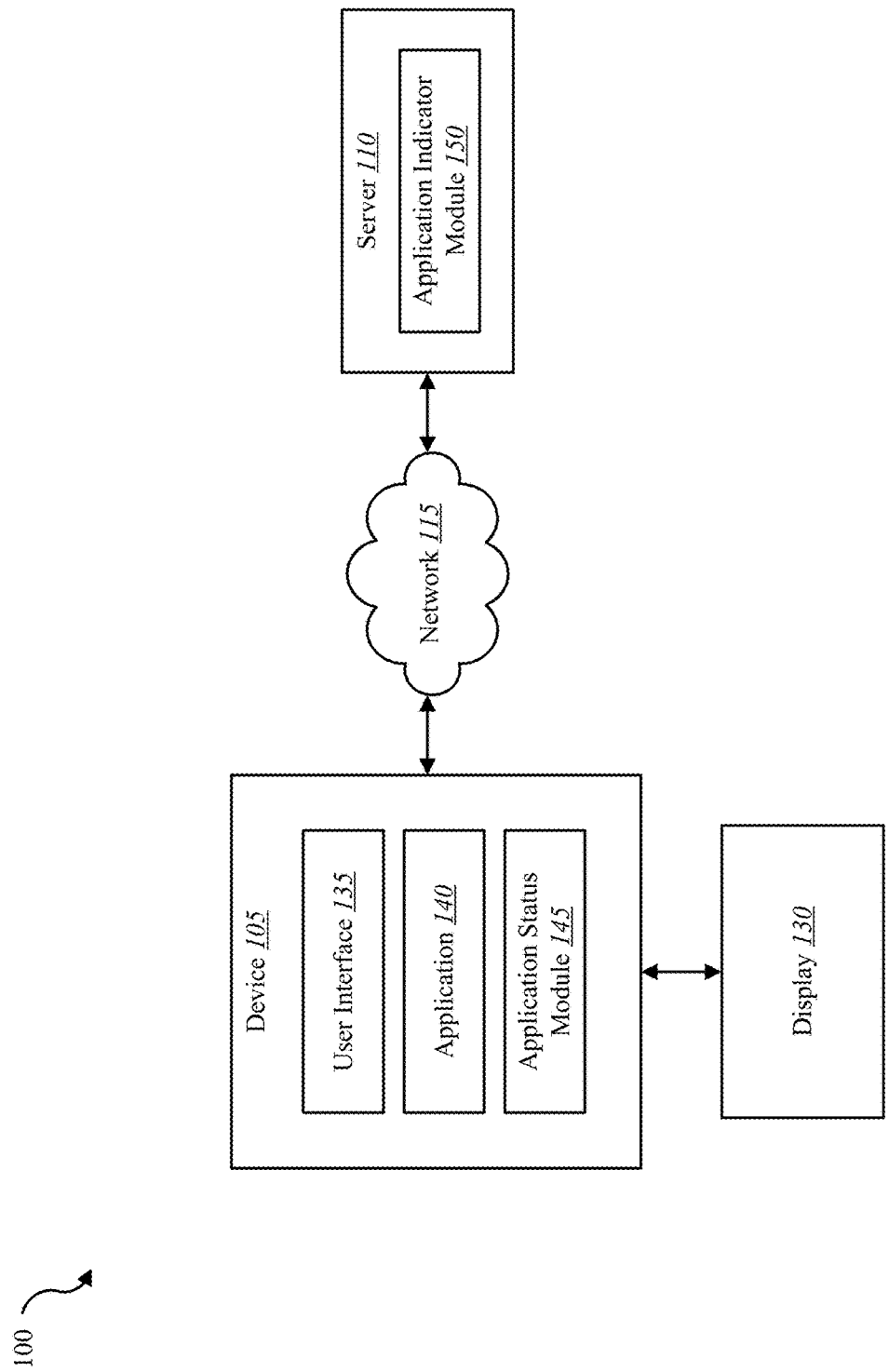
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to mobile devices. More specifically, the systems and methods described herein relate to dynamically altering a state of an application icon on a mobile device. Mobile devices may have several applications installed thereon. The applications may be for personal use or may be for professional use. In some embodiments, the applications may be issued by a company which may employ the user of the device. The company may enable the user to access portions of its information system using the application. In some instances, when a user connects their mobile device to a network provided by the company, the company may limit the users accessibility to functions of the applications. For example, a company may not wish for a user to take photos while on site. The company may have confidential information it wishes to protect. Additionally, the company may block access to social media sites, personnel email, or the like. The company may also enable the user to access applications associated with the company when the mobile device is connected to the network provided by the company. The user may not know which applications have limited, if any, capabilities until the application is launched. Dynamically altering a state of the application icon may alert the user to a change in the application's status.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, and a network 115 that allows the device 105 and server 110 to communicate with one another.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. Examples of server 110 may include any combination of a data server, a cloud server, a server associated with an automation service provider, proxy server, mail server, web server, application server, database server, communications server, file server, home server, mobile server, name server, etc.

In some configurations, the device 105 may include a user interface 135, application 140, and an application status module 145. Although the components of the device 105 are depicted as being internal to the device 105, it is understood that one or more of the components may be external to the device 105 and connect to device 105 through wired and/or wireless connections.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include an application status module 145. For example, device 105 may include application 140 that allows device 105 to interface the application status module 145 located on another device such as server 110 or another computing device. In some embodiments, server 110 may include an application indicator module 150 which may provide information and work in conjunction with the application status module on device 105. Likewise, in some embodiments, a user may access the functions of device 105 directly or through device 105 via the application status module 145. For example, in some embodiments, a computing device may include a mobile application that interfaces with one or more functions of device 105, uninstall prevention module 145, and/or server 110.

Application status module 145 may enable a user of the device 105 to determine a status of an application by simply viewing the application icon. The application icon may dynamically change based on the status of the application. The application may be unavailable due to one or more company guidelines when the mobile device is connected to a company network. Likewise, the application may be out of date and may require an update to be downloaded to the device 105. The application may have an irreparable error and may need to be uninstalled and reinstalled.

The application indicator module 150 may establish guidelines and/or rules in which to implement an application icon status change. The guidelines or rules may be issued from a company. The company may provide guidelines as to which applications employees are able to access when connected to a network associated with the company. The company may additionally provide guidelines as to which employees may access company applications and when those applications may be accessed. The application indicator module 150 may dynamically push the various rules and/or guidelines to the device 105. In further embodiments, the rules may be embedded into the target application. The device 105 may extract the rule from the application. Once the device 105 has located and/or received the rule, the device 105 may execute the rule.

Figure 2:
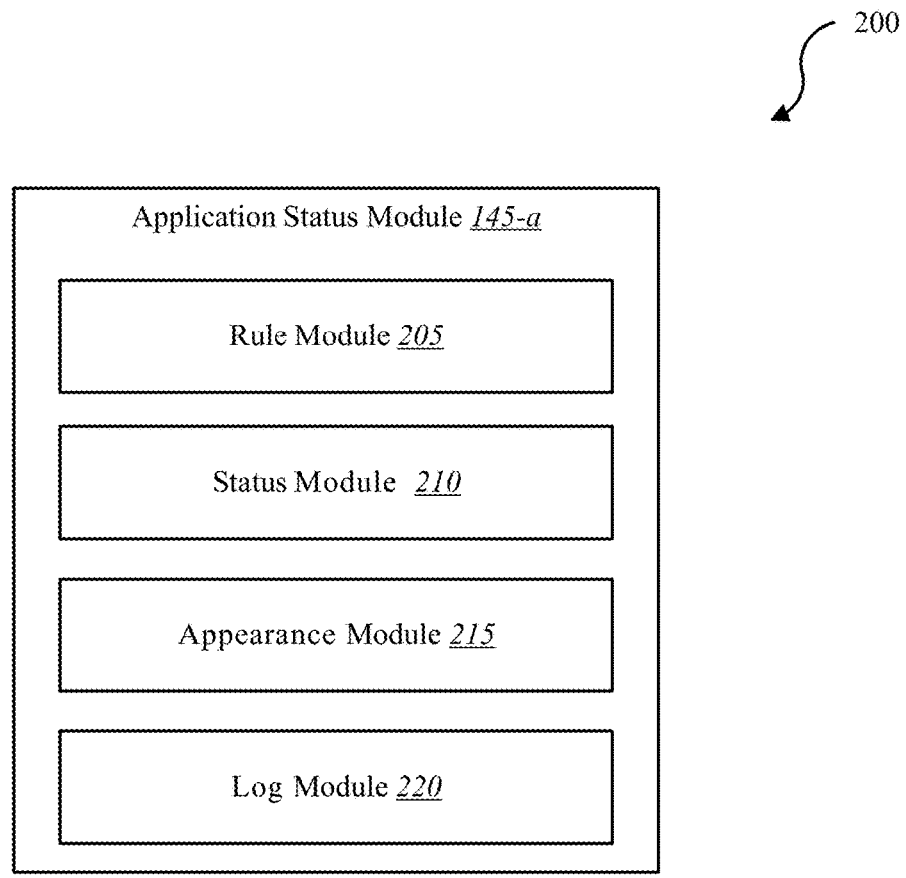
FIG. 2 is a block diagram illustrating one example of an application status module.

FIG. 2 is a block diagram illustrating one example of an application status module 145-*a*. The application status module 145-*a* may be one example of the application status module 145 depicted in FIG. 1. As depicted, the application status module 145-*a* may include a rule module 205, a status module 210, an appearance module 215, and a log module 220.

The functions of the application status module 145-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The rule module 205 may access, by the device, a customization rule. The customization rule may include directions to change a state of the application icon based at least in part on a detection of one or more customization parameters. The customization rule may be pushed to the device from a server (e.g. server 100, FIG. 1). The server may develop the rule and transmit the rule to the device. In another embodiment, the rule module 205 may detect the presence of a rule proximate an application. The rule may be embedded into the application. For example, the customization rule may be embedded into the application and extracted from the application when the application is first downloaded. The customization rule may additionally be embedded into an update for an application. The rule module 205 may recognize and execute the customization rule.

The status module 210 may track the one or more customization parameters to determine when to alter a state of an application icon. Altering a state of the application icon may include altering an appearance of the icon. The status module 210 may track the availability of a target application as a whole, or select functions and parameters of the application. For example, the status module 210 may determine when an entire application is blocked. The status module 210 may determine when a camera function is blocked. The status module may determine when a global positioning system (GPS) device has been disabled, and the like. The status module 210 may actively monitor the status of each application associated with a customization rule.

The appearance module 215 may dynamically alter a state of the application icon based at least in part on the customization rule and the detected customization parameter. The appearance module may change the appearance of the application icon when one or more customization parameters are satisfied. The application icon may indicate the status of the application to the user, negating the need for the user to access the application to determine its status. The appearance module 215 may use an index of application icon changes to communicate the status. For example, a green box surrounding an application icon may indicate the application icon is available. A skull put across the front of the application may indicate a fatal error with the application. A red box surrounding the application icon may indicate the application is not available. Similarly, a no-symbol may be placed in front of an application icon to communicate the status of the application is unavailable. If a select function of the application is not available, the application icon may be dynamically changed to relay that fact. For example, if a camera function is not available, a no-symbol across a camera may be proximate the application icon. In some embodiments, a size of the application icon may indicate its status. Larger icons may have complete working features whereas smaller icons may have fewer and fewer capabilities.

In some embodiments, the appearance module 215 may cause the application icon to completely disappear. If a user cannot view the application icon, the user may be unable to access the application while the application icon is not viewable. A parent may wish to deactivate access to select applications during predetermined time periods. For example, the parent may not wish for a child to use any applications during school time and/or may limit a child's access to application at other times as well such as meal time, bedtime, homework-time, and the like. In some embodiments, the parent may create a rule to cause all the applications to go invisible when the mobile device is in motion. This may help prevent a child from accessing or attempting to use their mobile device while driving. The appearance module 215 may provide an index of application icon changes to the user. The user may access the index to learn the different changes that may occur and may refresh their memory should an application be unavailable.

The log module 220 may record information pertaining to application icon changes. For example, the log module 220 may record when a user attempts to access an inaccessible or limited functionally application. The log may be delivered to a user's employer to track usage of a company issued mobile device. A parent may use the log to determine if a child's activity conforms to a preferred protocol. Additionally, the log module 220 may track all of the changes to the application icons and the customization rule parameters that caused the changes. This may allow a user to review the reasoning behind changes to their application status and application icons.

Figure 3:
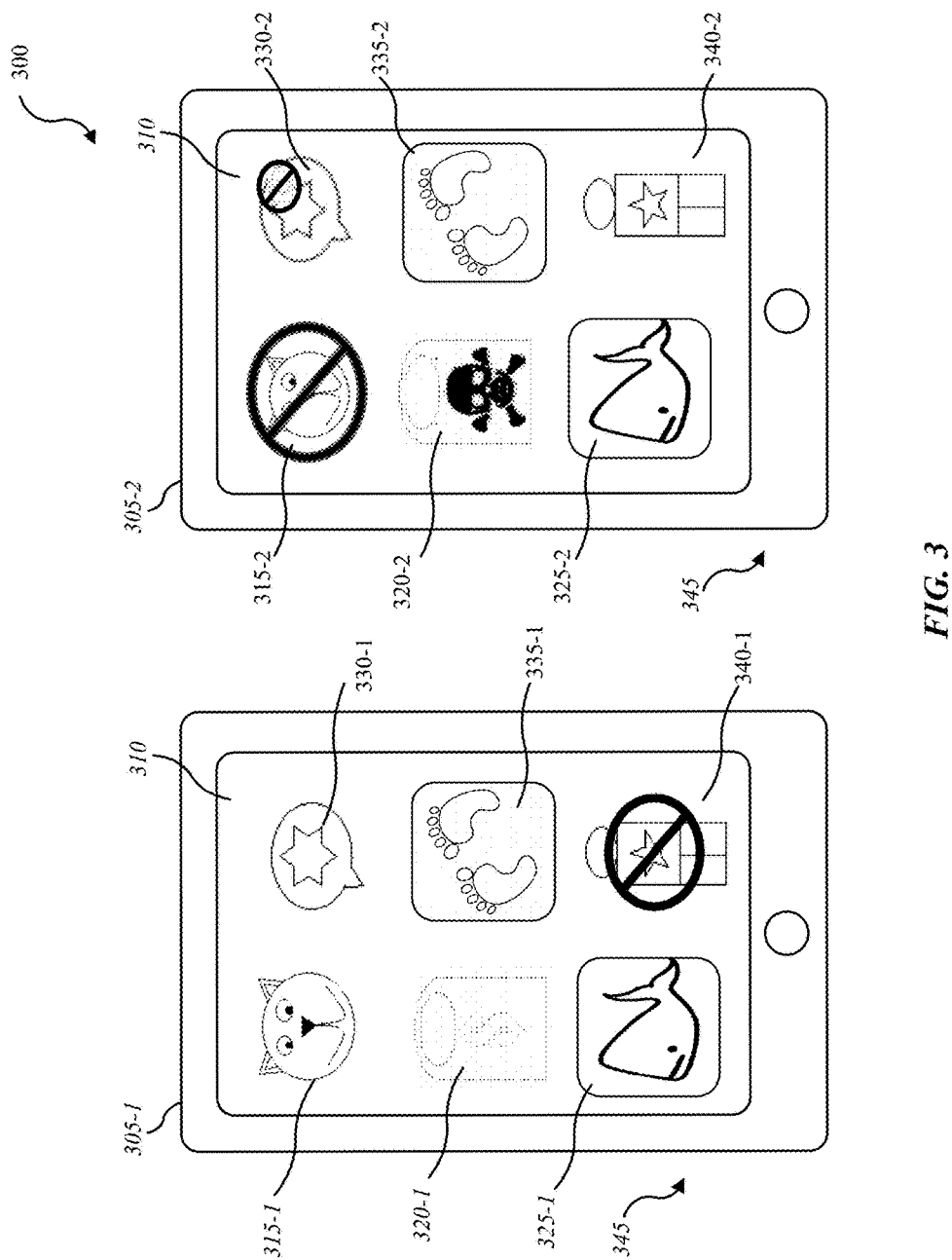
FIG. 3 is a block diagram illustrating one example of a dynamic application icon state change.

FIG. 3 is a block diagram illustrating one example of an environment 300 for dynamically altering a status of an application icon in relation to a mobile device 305. The mobile device 305 may be one example of device 105 of FIG. 1. As depicted, the environment 300 may include a first instance of the mobile device 305-1 and a second instance of the mobile device 305-2. In each instance, the device 305 may include a series of application icons 310-340 and a user interface 345.

For example, as illustrated, the device 305 may include several application icons 310-340. The application icons are shown in two instances, a first instance and a second instance. The first instance may show a user device 305-1 that is not connected to a company issued network. The application associated with application icon 340-1 may be issued by the company and, in the first instance, may not be available when the device 305-1 is not connected to the company issued network. The application icon 340-1 may show the application as unavailable. Meanwhile, in the first instance of the mobile device 305-1, the remaining personal applications may have normal application icons 315-1-335-1 indicating a fully functioning application.

In the second instance of the mobile device 305-2, the mobile device 305-2 may be connected to a company provided network. The company application icon 340-2 may return to its operational state indicating to the user that the application is now accessible. However, other personal applications may not be accessible. For example, application icon 315-2 may indicate the entire application is not accessible. Application icon 330-2 may indicate the camera feature of the application is not accessible. Application icon 320-2 may indicate a fatal error with the application. Application icons 325-2 and 335-2 may indicate the applications are fully accessible in the second instance.

Figure 4:
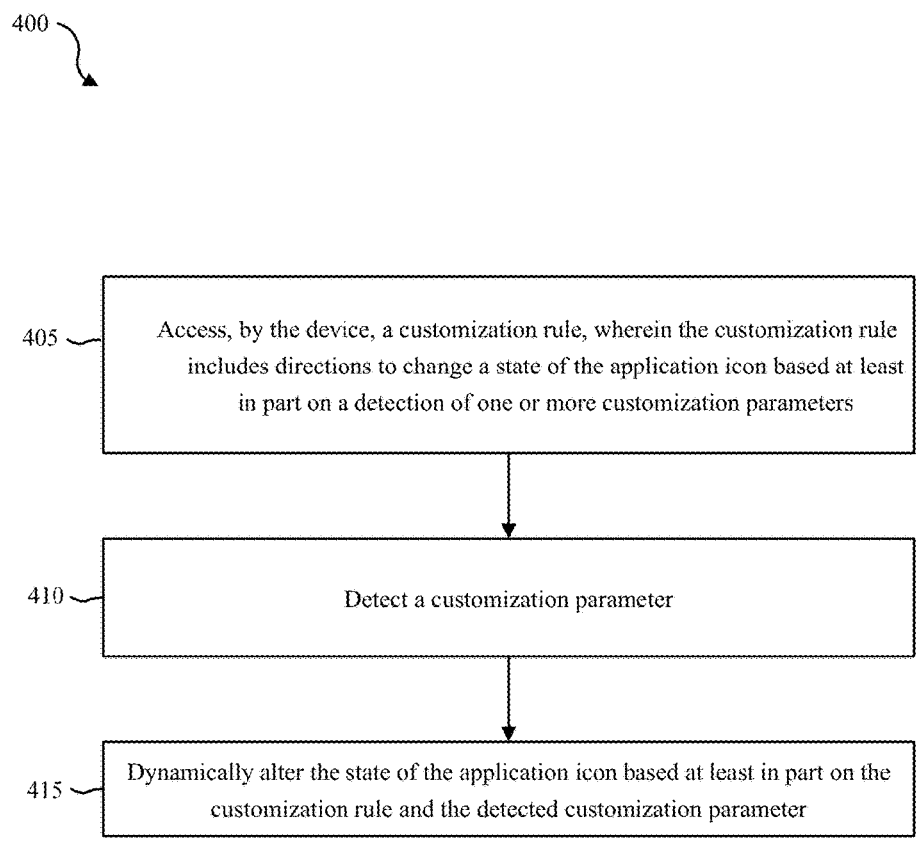
FIG. 4 is a flow diagram illustrating one embodiment of a method for dynamically altering a state of an application icon.

FIG. 4 is a flow diagram illustrating one embodiment of a method 400 for dynamically representing a status of an application. In some configurations, the method 400 may be implemented by the application status module 145 illustrated in FIGS. 1 and/or 2. In some configurations, the method 400 may be implemented in conjunction with the application 140 and/or the user interface 135 illustrated in FIG. 1.

At block 405, the method 400 may include accessing, by the device, a customization rule, wherein the customization rule may include directions to change a state of an application icon based at least in part on a detection of one or more customization parameters. The customization rule may be dynamically sent to the device from a server or may be embedded in an application or an application update. The device may search for the customization rule or may receive a trigger that a customization rule is present. Once the customization rule is located, the customization rule may be executed and be implemented on the device.

The operation(s) at block 405 may be performed using the rule module 205 described with reference to FIG. 2.

At block 410, the method 400 may include detecting a customization parameter. A customization parameter may include access to the application, the functionality of a part or the entirety of an application, access to features within the application, or some combination thereof. The customization parameters may be programmed by a user or a parent of user. The customization parameters may additionally be written by an employer of the user. The customization parameters may be dynamically tracked to determine when to change a status of the application icon.

The operation(s) at block 410 may be performed using the status module 210 described with reference to FIG. 2.

At block 415, the method 400 may include dynamically altering the state of the application icon based at least in part on the customization rule and the detected customization parameter. Altering the state of the application icon may include altering an appearance of the icon. Altering the appearance of an icon may include replacing the application icon with a new application icon, overlaying a symbol on top of an application icon to indicate a status, changing a background color of the application icon, changing the coloring of an application icon, changing a size of the application icon, or the like. The application icon may display select features of the application that are unavailable such as internet access, access to a GPS, access to a camera, and the like.

The operation(s) at block 415 may be performed using the appearance module 215 described with reference to FIG. 2.

Figure 5:
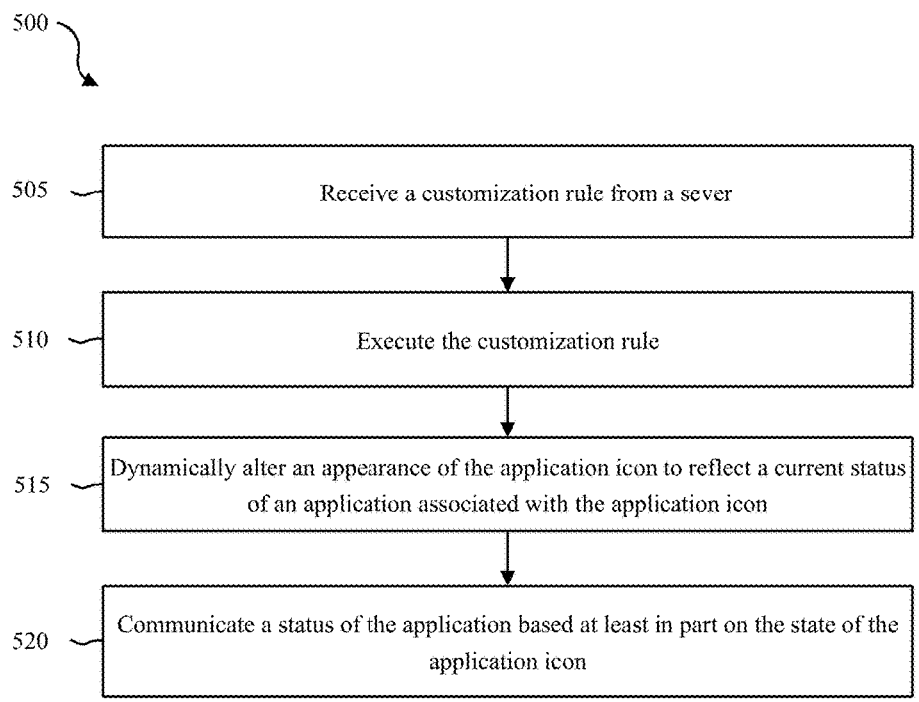
FIG. 5 is a flow diagram illustrating one embodiment of a method for dynamically altering a state of an application icon.

FIG. 5 is a flow diagram illustrating one embodiment of a method 500 for dynamically representing a status of an application. In some configurations, the method 500 may be implemented by the application status module 145 illustrated in FIGS. 1 and/or 2. In some configurations, the method 500 may be implemented in conjunction with the application 140 and/or the user interface 135 illustrated in FIG. 1.

At block 505, the method 500 may include receiving a customization rule from a server. The server may dynamically push a customization rule to the device. The customization rule may be a new customization rule or may be an update to an existing customization rule. The customization rule may be specific to a company or may be a customization rule developed by a user or another party to alter the appearance of an application icon. The customization rule may define one or more customization parameters, which, when satisfied, may result in the altering of an appearance of an application icon.

At block 510, the method 500 may include executing the customization rule. Once the device receives the rule, the device may determine an authenticity of the rule. For example, the device may ping the user as to whether or not to execute the customization rule. The user may have the option of viewing the customization parameters to determine if the user wishes to activate the rule. In another embodiment, the device may automatically execute the customization rule upon receipt of the customization rule.

The operation(s) at blocks 505 and/or 510 may be performed using the rule module 205 described with reference to FIG. 2.

At block 515, the method 500 may include dynamically altering an appearance of the application icon to reflect a current status of an application associated with the application icon. The method 500 may continuously detect the status of an application. If the application status changes or alters, the method 500 may alter the appearance of the application icon. At block 520, the method 500 may include communicating a status of the application based at least in part on the state of the application icon. The appearance of the application icon may communicate a status of the application to a user of the mobile device. This may negate the need for the user to open the application to determine its status. The user may be provided with an index of application icon changes which may allow the user to determine an application status.

The operation(s) at block 515-520 may be performed using the appearance module 215 described with reference to FIG. 2.

Figure 6:
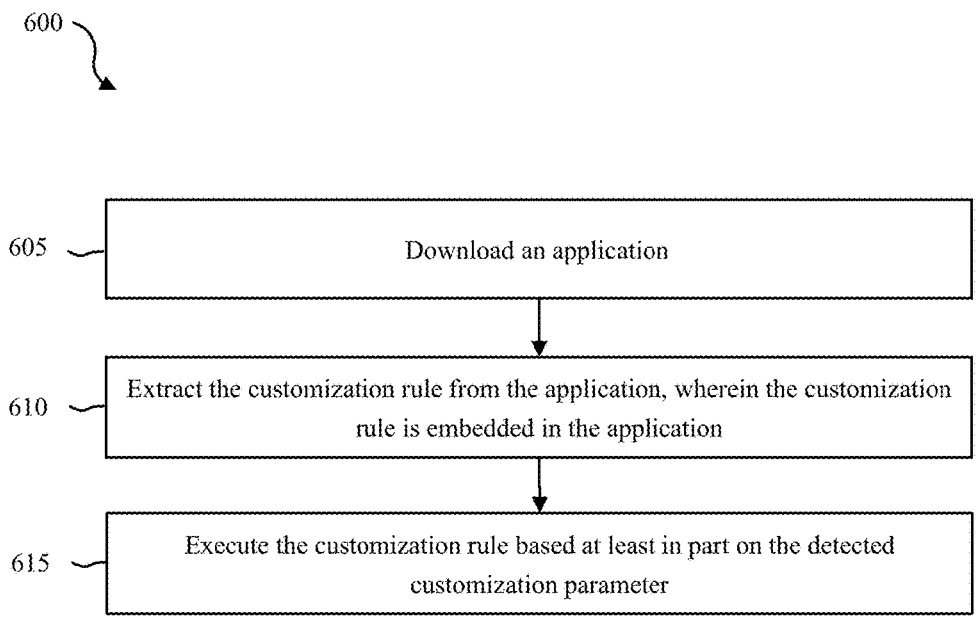
FIG. 6 is a flow diagram illustrating one embodiment of a method for dynamically altering a state of an application icon.

FIG. 6 is a flow diagram illustrating one embodiment of a method 600 for dynamically representing a status of an application. In some configurations, the method 600 may be implemented by the application status module 145 illustrated in FIGS. 1 and/or 2. In some configurations, the method 600 may be implemented in conjunction with the application 140 and/or the user interface 135 illustrated in FIG. 1.

At block 605, the method 600 may include downloading an application. The user may access an application store through their device or may send an application to their device for download. At block 610, the method 600 may include extracting a customization rule from the application, wherein the customization rule is embedded in the application. The application may include an indicator that a customization rule is embedded therein. The customization rule may be extracted. Once extracted, at block 615, the method 600 may include executing the customization rule based at least in part on a detected customization parameter. Once the rule is executed, the state of an application icon may change depending upon at least a status of the corresponding application and one or more customization parameters.

The operation(s) at blocks 605-615 may be performed using the rule module 205 and/or the status module 210 described with reference to FIG. 2.

Figure 7:
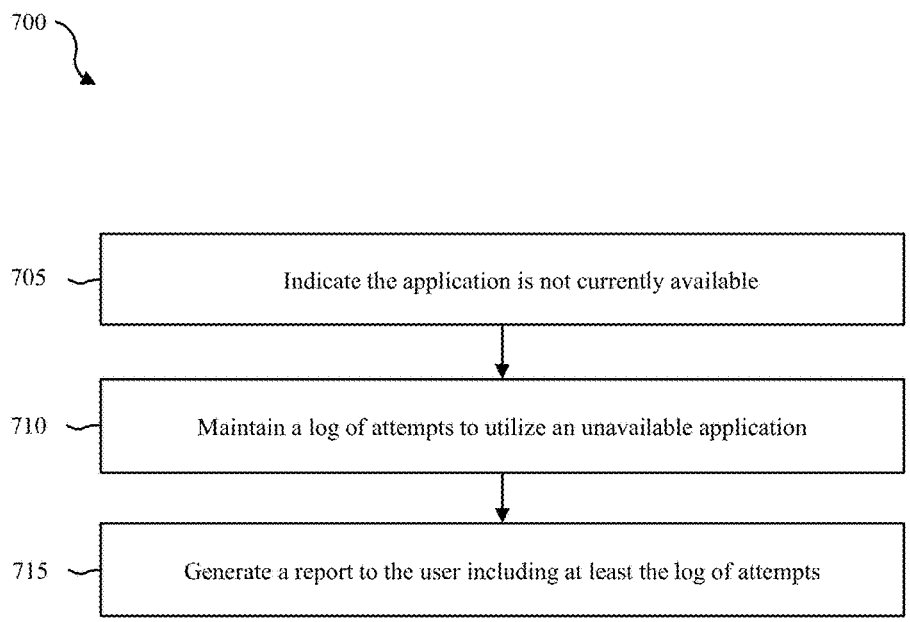
FIG. 7 is a flow diagram illustrating one embodiment of a method for dynamically altering a state of an application icon.

FIG. 7 is a flow diagram illustrating one embodiment of a method 700 for dynamically representing a status of an application. In some configurations, the method 700 may be implemented by the application status module 145 illustrated in FIGS. 1 and/or 2. In some configurations, the method 700 may be implemented in conjunction with the application 140 and/or the user interface 135 illustrated in FIG. 1.

At block 705, the method 700 may include indicating the application is not currently available. The application icon may be completely invisible which may indicate the application is not accessible. The application may additionally comprise one of a multitude of symbols described herein to representation the unavailability of the application. For example, a no-symbol may overlay the application icon. The application icon may appear grayed out. The application icon may be diminished to a reduced size indicating its unavailability. The application icon may be turned red or may have a red background or outline. Other indicators may be used to indicate the unavailability of an application via its application icon.

The operation(s) at block 705 may be performed using the appearance module 715 described with reference to FIG. 2.

At block 710, the method 700 may include maintaining a log of attempts to utilize an unavailable application. The log of attempts may be used by a parent, company, the user, or the like to determine when a user attempted to access an application that was unavailable. At block 715, the method 700 may include generating a report to the user including at least the log of attempts. This may enable the user to review the application changes via application icon states and determine if changes in the customization rules may be required. The alteration of the application icon may not be severe enough to communicate the state of the application to the user. Additionally, a company and/or parent may view the log and determine when a stricter mobile device policy may be required. If a user is continuously attempting to access unavailable applications, the user may be distracted from another job such as school or work.

The operation(s) at block 710-715 may be performed using the log module 220 described with reference to FIG. 2.

Figure 8:
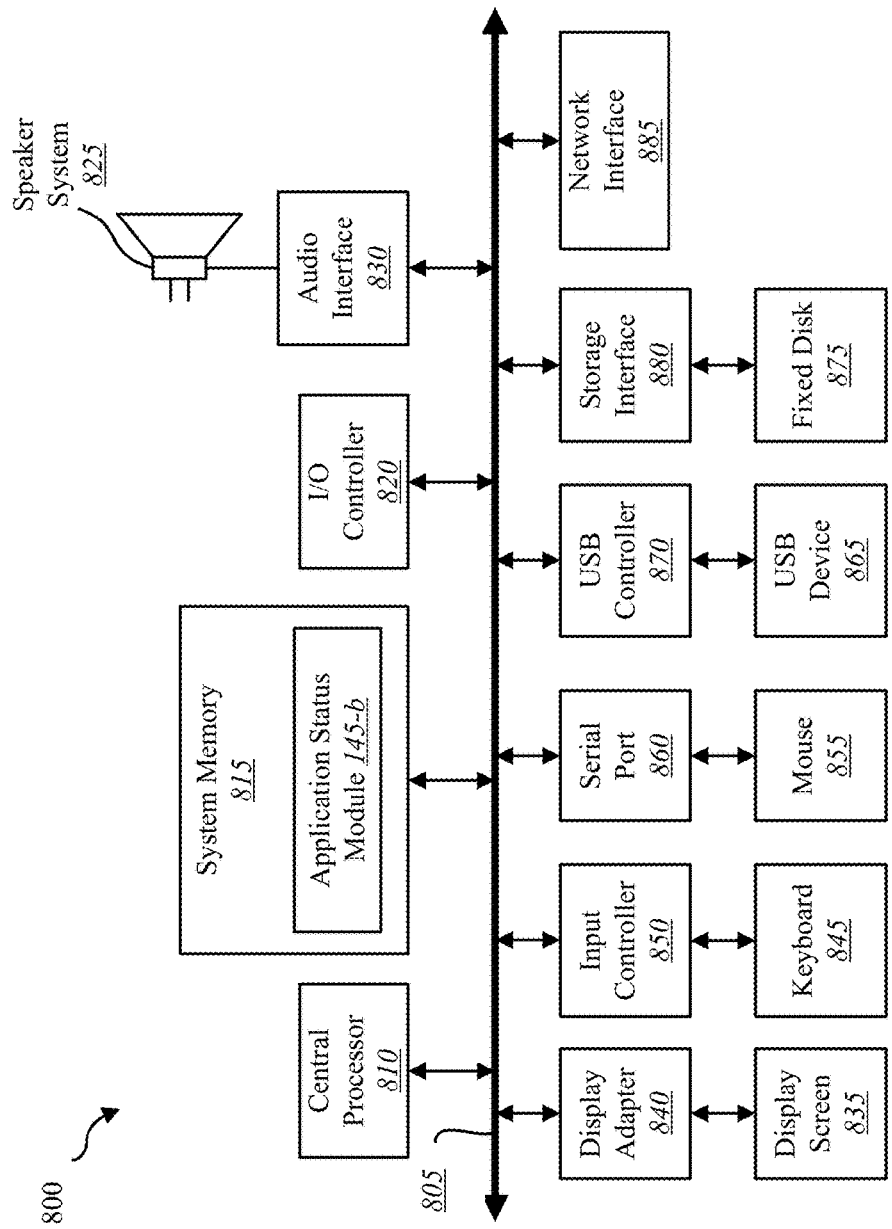
FIG. 8 depicts a block diagram of a computer system suitable for implementing the present systems and methods.

FIG. 8 depicts a block diagram of a computing device 800 suitable for implementing the present systems and methods. The device 800 may be an example of device 105 and/or server 110 illustrated in FIG. 1. In one configuration, device 800 includes a bus 805 which interconnects major subsystems of device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the application status module 145-b to implement the present systems and methods may be stored within the system memory 815. The application status module 145-b may be one example of the application status module 145 depicted in FIGS. 1 and/or 2. Applications (e.g., application 140) resident with device 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of device 800, can connect to a standard computer readable medium for storage and/or retrieval of information, such as a fixed disk drive 875. Fixed disk drive 875 may be a part of device 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 800 wirelessly via network interface 885.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on device 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method to dynamically customize an application icon on a device, comprising:
    accessing, by the device, a customization rule, wherein the customization rule includes directions to change a state of the application icon of an application installed on the device based at least in part on a detection of one or more customization parameters and at least one aspect of a network to which the device is connected;
    detecting a customization parameter and the at least one aspect of the connected network;
    dynamically altering the state of the application icon based at least in part on the detected customization parameter and the detected at least one aspect of the connected network, wherein dynamically altering the state of the application icon includes indicating the application is not currently available; and
    maintaining a log of attempts to utilize the application whose application icon is marked as being currently unavailable, wherein the log of events comprises a listing of alterations made to the state of the application icon.

2. The computer-implemented method of claim 1, wherein dynamically altering the state of the application icon further comprises:
    dynamically altering an appearance of the application icon to reflect a current status of the application associated with the application icon.

3. The computer-implemented method of claim 1, further comprising:
    receiving the customization rule from a server; and
    executing the customization rule.

4. The computer-implemented method of claim 1, further comprising:
    downloading the application;
    extracting the customization rule from the application, wherein the customization rule is embedded in the application; and
    executing the customization rule based at least in part on the detected customization parameter.

5. The computer-implemented method of claim 1, further comprising:
    communicating a status of the application based at least in part on the state of the application icon.

6. The computer-implemented method of claim 1, wherein dynamically altering the state of the application icon further comprises:
    causing the application icon to become invisible.

7. The computer-implemented method of claim 6, wherein an invisible application icon prevents a user from accessing the application associated with the application icon.

8. The computer-implemented method of claim 1, further comprising:
    generating a report to the user including at least the log of attempts.

9. The computer-implemented method of claim 1, further comprising:
    providing an index of meanings of different application icon appearance changes.

10. The computer-implemented method of claim 1, wherein the customization parameter comprises at least one of a connectivity status, or a usage status, or an access status, or an allowable status, or a restriction status, or a combination thereof.

11. A computing device configured for dynamically indicating a status of an application, comprising:
    a processor;
    memory in electronic communication with the processor, wherein the memory stores computer executable instructions that when executed by the processor cause the processor to perform the steps of:
        access, by the device, a customization rule, wherein the customization rule includes directions to change a state of the application icon of an application installed on the device based at least in part on a detection of one or more customization parameters and at least one aspect of a network to which the device is connected;
        detect a customization parameter and the at least one aspect of the connected network;
        dynamically alter the state of the application icon based at least in part the detected customization parameter and the detected at least one aspect of the connected network, wherein dynamically altering the state of the application icon includes indicating the application is not currently available; and
        maintaining a log of attempts to utilize the application whose application icon is marked as being currently unavailable, wherein the log of events comprises a listing of alterations made to the state of the application icon.

12. The computing device of claim 11, wherein the instructions to dynamically alter the state of the application icon further comprise:
    dynamically alter an appearance of the application icon to reflect a current status of the application associated with the application icon.

13. The computing device of claim 11, wherein the instructions executed by the processor cause the processor to perform the steps of:
    receive the customization rule from a server; and
    execute the customization rule.

14. The computing device of claim 11, wherein the instructions executed by the processor cause the processor to perform the steps of:
    download the application;

extract the customization rule from the application, wherein the customization rule is embedded in the application; and execute the customization rule based at least in part on the detected customization parameter.

15. The computing device of claim 11, wherein the instructions executed by the processor cause the processor to perform the steps of:

communicate a status of the application based at least in part on the state of the application icon.

16. The computing device of claim 11, wherein the instructions executed by the processor cause the processor to perform the steps of dynamically alter the state of the application icon further comprise:

cause the application icon to become invisible.

17. The computing device of claim 16, wherein an invisible application icon prevents a user from accessing the application associated with the application icon.

18. The computing device of claim 11, wherein the instructions executed by the processor cause the processor to perform the steps of:

generate a report to the user including at least the log of attempts.

19. A non-transitory computer-readable storage medium storing computer executable instructions that when executed by a processor cause the processor to perform the steps of:

access, by the device, a customization rule, wherein the customization rule includes directions to change a state of the application icon of an application installed on the device based at least in part on a detection of one or more customization parameters and at least one aspect of a network to which the device is connected;

detect a customization parameter and the at least one aspect of the connected network;

dynamically alter the state of the application icon based at least in part on the detected customization parameter and the detected at least one aspect of the connected network, wherein dynamically altering the state of the application icon includes indicating the application is not currently available; and maintaining a log of attempts to utilize the application whose application icon is marked as being currently unavailable, wherein the log of events comprises a listing of alterations made to the state of the application icon.

* * * * *